United States Patent [19]
Goodman, Sr.

[11] Patent Number: 5,503,931
[45] Date of Patent: Apr. 2, 1996

[54] MOISTURE ABSORBING MATERIAL AND METHODS OF PRODUCTION

[76] Inventor: Elstun F. Goodman, Sr., 6515 Mona Vista Dr., Houston, Tex. 77083

[21] Appl. No.: 288,468

[22] Filed: Aug. 10, 1994

Related U.S. Application Data

[63] Continuation-in-part of Ser. No. 58,330, May 10, 1993, abandoned.

[51] Int. Cl.$^6$ ....................... B32B 5/16
[52] U.S. Cl. ................ 428/402; 428/446; 428/452; 502/407; 502/411; 502/413; 106/605; 106/618; 423/335; 423/337; 501/85; 501/133
[58] Field of Search ................ 428/446, 452, 428/34.3, 402; 502/407, 411, 413, 85, 133, 154; 423/332, 335, 334, 337; 501/85, 133, 154; 106/605, 618

[56] References Cited

U.S. PATENT DOCUMENTS

| | | | |
|---|---|---|---|
| 1,293,008 | 2/1919 | Blardone | 423/332 |
| 4,619,911 | 10/1986 | Goodwin | 502/411 |

*Primary Examiner*—Ellis P. Robinson
*Assistant Examiner*—Timothy M. Speer
*Attorney, Agent, or Firm*—Kenneth A. Roddy

[57] ABSTRACT

An improved moisture absorbing amorphous silicate material formed by the steps of: parboiling rice under 22 psi and at a temperature above 212 degrees F. to force bran into the rice grain and dissolve cellulose from the rice hulls creating voids in the rice hulls; drying the parboiled rice; milling the parboiled rice into grain, bran, and broken rice hulls; separating the broken rice hulls from the grain and bran; and burning the broken rice hulls at high temperatures to produce a skeletal residue of amorphous silicate material. Several uses of the amorphous silicate material are disclosed.

1 Claim, No Drawings

MOISTURE ABSORBING MATERIAL AND METHODS OF PRODUCTION

CROSS-REFERENCE TO RELATED APPLICATION

This application is a CIP of U.S. Ser. No. 08/058,330 filed May 10, 1993, now abandoned.

BACKGROUND OF THE INVENTION

1. Field of the Invention

The present invention pertains to moisture absorbing materials. More specifically, the present invention pertains to moisture absorbing materials made from rice hulls.

2. Description of the Prior Art

There are many environmental situations in which too much water or other liquids are present. To remedy such, various means are used to reduce the presence of excessive liquids. If a large amount of liquid accumulates at one location, it may be pumped, bailed or otherwise transferred to some other location. In other situations, drying must occur by simply depending on time consuming natural environmental drying processes. To speed up drying or absorption of liquids, a number of desiccant or drying agents may be used. For example, calcium chloride is a commonly used desiccant. However, some desiccants have various undesirable characteristics. They may be relatively expensive. They may be severely limited in absorbing capacity. They may not be easy to remove after absorbing capacity is exhausted. Such desiccants may not be practical for recycling, i.e. capable of reclaiming the liquids absorbed thereby.

There are other situations in which retention of fluids is desired. For example, in the soil of dry and arid environments, it may be desirable to collect water when available and hold the water for subsequent gradual release. If not properly collected and retained, the water may quickly evaporate and not be available for absorption by the roots of plants in the soil.

A variety of materials have been used as desiccants or moisture absorbing agents. One such material is rice hulls. Since rice hulls have been generally regarded as a waste product of preparation of rice grains, they are readily available and inexpensive. In U.S. Pat. No. 4,407,789, rice hulls, ground into fine particles are used as a component of body powder to provide moisture absorption capabilities, it being asserted that such unburned rice hulls absorb 16% moisture by weight. In U.S. Pat. No. 4,619,911, burned rice hull ash is a component of lightweight silicate aggregate which can be used as an absorbent of improved characteristics or as a filler for concrete. However, to produce the desired results, the rice hull ash must be mixed with an alkali metal hydroxide, boric acid and water, heated to approximately 160° F. and cured. After crushing and grinding into discrete particles, the composition must be heated and expanded in a furnace at temperatures of between 800° F. and 1000° F. However, such a material would be toxic and unsafe for use in soils for edible plant production.

Pure, cheap, easy to produce and easy to use liquid absorbing materials are needed for a variety of uses. Such materials which collect and retain liquids, such as water, for gradual future use are especially needed for agricultural uses.

SUMMARY OF THE PRESENT INVENTION

In the present invention, a new and improved material for absorbing excess water or other liquids is provided. This material is made from rice hulls produced in a specific manner and without any additives thereto. The material is formed by the steps of: parboiling rice, which dissolves cellulose from the hull; drying and milling the parboiled rice to separate broken rice hulls from the grain and bran of the parboiled rice; and burning the broken rice hulls to produce a residue of amorphous silicate. The parboiling and drying of the rice and burning of the rice hulls are done under predetermined conditions to produce a skeletal residue of amorphous silicate which is especially suitable for absorbing water or other liquids. This material may be placed in sacks or other pervious containers and used as a desiccant. It may also be placed in holes in the ground to absorb excess moisture therefrom. Since it is pure and non-toxic, it may be placed in holes in the ground near plant materials to retain moisture for subsequent release and use by the plant materials during periods of dry weather. It may also be mixed with soil of arid regions to provide a more moisture retentive soil without fostering mold or mildew. The material of the present invention has many objects, advantages and uses which will be more apparent from reading the description which follows.

DESCRIPTION OF THE PRESENT INVENTION

Rice, the seed of the rice plant, is made up of three components: hull, bran and grain. The grain and bran of rice are consumable food products. The hull is not. The rice hulls from the production and processing of rice for food have been used as compost, animal bedding, etc. Rice hulls have also been used as fuel for producing heat in various manufacturing processes. In fact, rice hulls have been used as fuel in rice food processing plants.

In one process, rice is parboiled with hulls on and then dried. After drying, it is milled to separate the rice grain, bran, and hulls. The hulls may be used as a fuel to parboil additional rice. The residue from the burned rice hulls has been found to be marginally effective as a desiccant or moisture absorbing material. To render the burned rice hulls more effective as a desiccant or moisture absorber, others, such as U.S. Pat. No. 4,619,911, have further treated the rice hull ash by heating a mixture of rice hull ash, alkali metal hydroxide, boric acid and water to form a solid mass, comminuting the solidifed mass into discrete particles and then expanding the descrete particles by rapid heating. However, as previously pointed out, the addition of alkali metal hydroxide and boric acid makes such materials unsuitable for use in plant soil since the soil would be toxically contaminated.

In producing the new and improved material of the present invention, rice, generally having a moisture content of approximately 12% by volume, is parboiled under pressure (preferably 12–18 PSI, not exceeding 22 PSI) at a temperature in excess of 212 degrees F. The rice is preferably parboiled until the moisture content of the rice is substantially increased, e.g. in excess of 30%. In the present process of parboiling under 22 psi and at a temperature above 212 degrees F., bran is forced into the rice grain and cellulose is dissolved from the rice hulls, creating voids in the rice hulls. After the rice is parboiled, it is then dried to a moisture content of less than 14% by volume, say 10% to 14% by volume. During parboiling and drying, the rice hull internally fractures into a number of pieces. After the parboiled rice is dried, it is milled (ground or crushed) by a hammermill or the like to separate the fractured and broken rice hulls from the rice grain and bran. The hulls are broken into many small pieces and separated for further processing.

After the rice hulls are broken into small pieces and separated from the grain and bran, the "skeletonized" hulls are burned, preferably as a fuel, at temperatures preferably between 700 and 2100 degrees F., literally exploding as the moisture in the hulls quickly becomes steam. The residue from burning of the rice hulls is a very lightweight amorphous silicate of unusual characteristics. Its bulk density is in the range of 23 to 28 lbs./ft$^3$. The material is predominantly silicon dioxide and other oxides (91 to 95% by weight). Its carbon content, by weight, is in a range of 5 to 9%. It contains 2 to 5 ppm nitrates and 400 to 1000 ppm nitrogen (nonsoluble form). The amorphous silicate produced by such high temperature burning is sterile and non-biodegradable.

In the method of producing the amorphous silicate material just described, rice hulls are obtained as the by-product of a particular rice process. However, the material can be produced from rice hulls obtained from any process in which the rice hulls are separated from the rice grain. In such cases, the separated rice hulls would be parboiled, dried and broken into pieces in substantially the same manner as described when these steps are performed with rice grain therein. After these steps, the burning of the rice hulls is performed at between 700 and 2100 degrees F. as previously stated.

The temperature at which the hulls are burned will vary depending on the type of rice from which they come. The burning temperature is extremely important. If burned under 700 degrees F., the hull merely carbonizes and when exposed to water will float for thirty to fifty minutes before absorbing only 45% to 54% moisture. Equally, important is the parboiling and removal of cellulose associated with the rice hulls. For example, full size rice hulls which have not been parboiled will absorb only 45% to 65% moisture even when burned at 700 degrees F. to 2100 degrees F.

It is theorized that in the pressure parboiling, drying and high temperature burning of rice hulls to create a residue of amorphous silicate, the material is formed with many chambers or cells vacated by cellulose and expanded by heating. Each minute cell has openings which allow a variety of liquids of a wide range of viscosity to flow into and displace air from the cells or chambers. These cells are non-selective in absorption of multiphase liquids. However, the liquid of least viscosity would usually be absorbed first. When the chambers are filled, they have a tendency to retain the liquid because of surface tension of the liquids in their static state. Furthermore, due to equalizing flow through holes in each chamber, all the chambers tend to reach a state of equilibrium. It is found that this material is capable of absorbing liquids of almost 100% of its own volume. It is estimated that the material has eighty square meters of internal surface area per gram of weight.

The unique material of the present invention has many uses. It is particularly effective as a desiccant or moisture absorbing material to remove excess liquids in many situations. For ease of handling, a quantity of the material may be placed in a bag of porous fabric, woven or non-woven, which easily allows liquid to pass through the bag fabric into the moisture absorbing material. There are several uses for the material so bagged. For example, for low spots on roofs, tennis courts, playgrounds, etc., a bag of the material may be placed in a puddle of water to absorb the water therefrom. In some cases, such as on a roof, the bag is simply left in place and the water absorbed by the material will be wicked or released back into the atmosphere by the warm sun and winds to which it is exposed. Due to breaking of the surface tension by the material, the pooled water dissipates in hours instead of weeks.

A bag of the material may be used to soak up water spills in homes and places of business. Grocery stores may find the material useful in soaking up excess moisture around frozen food cabinets. A bag of the material may be used to soak up water, gas and oil in the bottom of small boats. A bag of the material may be used to soak up leaked hydrocarbons, chemicals or other hazardous materials. The material may even be used to absorb medical waste, subjected to temperatures of 2000 degrees F. for sterilization and recycled again.

In other applications, the moisture absorbing material of the present invention may be placed in one or more holes in the ground of a wet prone area to absorb excess moisture therefrom. This "dry well" method is similar to a French drain but several thousand times more effective. For example, the second base area of a ball diamond is notorious for remaining in a puddle. One or more holes several inches or feet deep may be placed in the ground in the puddle-prone area and filled with the absorbing material of the present invention. If desired, the tops of the holes may be covered with sod or sand. After a rain, the material in the hole will absorb excess water and dry the area within minutes or a very few hours as compared to many hours or several days without such treatment. This is also true of heavy traffic areas on golf courses and around golf cart bridges that typically have puddles at each end.

It has also been found that the moisture absorbing material of the present invention may be placed in holes in the ground near living plants to retain moisture and provide more balanced release of moisture to the plants as needed. The material in the holes will soak up extra water and gradually release the excess water to the soil as the soil begins to dry, providing water to the plants which would normally be receiving little water from the dried soil. Such arrangements can also reduce watering time and intervals between watering for crops raised by irrigation. It can provide water to house plants while the owner is vacationing or away for extended periods of time.

It has also been found that the water absorbing material of the present invention can actually be mixed with sand or other top soil so that the soil will retain moisture for a longer period of time to allow for absorption by plant root systems. This is particularly desirable for dry arid regions to make optimum use of sparse rainfall or irrigation water. Fertilizer placed in a solution of water may also be absorbed, retained and gradually released by the material. The material is inert, non-toxic and does not change the Ph of the soil with which it is mixed.

Since the moisture absorbing material of the present invention is formed by burning at high temperatures, it is sterile. Thus, when placed in the ground for plants, it inhibits or prevents the growth of aerobic and anaerobic bacteria (such as mold and mildew) which normally disturbs growth patterns in some soils. Most importantly, it will not contaminate food from plants grown in such soils.

The new and improved liquid absorbing material of the present invention is unique. It is formed from rice hulls, a by-product and sometimes waste material from the processing of rice for food. It is thus relatively plentiful and cheap. It may be obtained from rice grown all over the world.

Not only is the liquid absorbing material of the present invention easily obtainable, it is extremely effective in a variety of uses. It may be placed in bags to soak up water or other liquids from puddles. It may be placed in holes in the ground to soak up extra moisture in wet prone areas or in more controlled storing and release of water and/or liquid fertilizers to the root system of the plant materials. It may actually be mixed in soil to improve water retention characteristics of the soil. The uses of the material in absorbing water or other liquids is limited only by the imagination.

A single method with variations is disclosed herein for producing the moisture absorbing material of the present invention. A number of uses of the material are described. However, other methods and many, many uses can be made by those skilled in the art. Accordingly, it is intended that the scope of the invention be limited only by the claims which follow.

I claim:

1. An improved lightweight, sterile moisture absorbing amorphous particulate silicate material comprising from 91% to 95% by weight silicon dioxide with 2 to 5 ppm nitrates and 400 to 1000 ppm nitrogen in non-soluble form, a carbon content of from 5% to 9% by weight, and having a bulk density in the range of from 23 to 28 pounds per cubic foot obtained by burning rice hulls which have been parboiled under pressure and at a temperature to dissolve cellulose from the hulls and increase the moisture content thereof to at least 30%, then dried to reduce the moisture content to less than 14% by volume to cause internal fracturing, and then broken into pieces wherein said particulate amorphous silicate is cellular and non-biodegradable.

* * * * *